United States Patent
Bober et al.

(10) Patent No.: US 10,308,194 B2
(45) Date of Patent: Jun. 4, 2019

(54) LOCATING APPARATUS AND METHOD FOR DECORATIVE BADGING FOR VEHICLES

(71) Applicant: Calsonic Kansei North America, Inc., Farmington Hills, MI (US)

(72) Inventors: Brian Bober, West Bloomfield, MI (US); Orv M. Brow, New Paris, IN (US); Justina Strzelecki, Byron, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 0 days.

(21) Appl. No.: 15/694,746

(22) Filed: Sep. 1, 2017

(65) Prior Publication Data

US 2019/0071030 A1    Mar. 7, 2019

(51) Int. Cl.
*B60R 13/02* (2006.01)
*B60R 13/00* (2006.01)

(52) U.S. Cl.
CPC ........ *B60R 13/0206* (2013.01); *B60R 13/005* (2013.01); *B60R 13/0262* (2013.01)

(58) Field of Classification Search
CPC .... B60R 13/005; B60R 13/0206; B60R 13/02
USPC ................... 296/1.08, 39.1; 428/31
See application file for complete search history.

(56) References Cited

U.S. PATENT DOCUMENTS

| | | | | |
|---|---|---|---|---|
| 7,963,586 B2 * | 6/2011 | Muller | .................. | B29C 65/606 296/1.08 |
| 2010/0189989 A1* | 7/2010 | Katou | ................. | B29C 44/1238 428/309.9 |

FOREIGN PATENT DOCUMENTS

| JP | H01-151800 U | 10/1989 |
|---|---|---|
| JP | 2013-252834 | * 12/2013 |

* cited by examiner

*Primary Examiner* — Dennis H Pedder
(74) *Attorney, Agent, or Firm* — Foley & Lardner LLP (57) ABSTRACT

An attachment structure for a decorative vehicle component includes a base having a recess therein, a skin covering the base, and an ornament coupled to the base over a portion of the skin. The ornament includes a boss structured to engage with the recess so as to be inserted within the recess. A fastener couples the boss to the recess. An upper surface of the ornament is substantially flush with an upper surface of the skin. The recess and the boss are configured to locate the ornament relative to the base.

13 Claims, 8 Drawing Sheets

LOCATING APPARATUS AND METHOD FOR DECORATIVE BADGING FOR VEHICLES

FIELD OF THE DISCLOSURE

The present application relates generally to decorative badging of vehicle interiors. More specifically, the present application relates to apparatuses and methods for locating a decorative badge in a component of a vehicle interior.

BACKGROUND

Vehicle interiors include soft material (e.g., vinyl or leather) which is exposed to and visible by vehicle occupants. For example, a vehicle console in a vehicle interior may include a lid having a decorative badge which is embedded in the lid. The decorative badge may be, for example, a representation of a manufacturer logo or an emblem displaying particular vehicle model information.

One issue associated with conventional arrangements is that decorative badges may be provided in the soft material of the interior in a way that makes it difficult to maintain the location of the badge. For example, the decorative badge may move so as to be deviated from an original intended position. In particular, the decorative badge may be moved off-center or otherwise rotated. Further, flushness of the decorative badge with the surrounding material of the interior may be impacted due to movement of the decorative badge. These phenomena may degrade the intended aesthetic impression and intended positioning of the decorative badge. Accordingly, it would be advantageous to provide an improved system and method for locating and retaining decorative badging and similar components within vehicle interiors or in other applications where decorative badging may be applied to soft materials.

SUMMARY

The present disclosure sets forth structures and methods for enhanced fixation and assembly of decorative badges in vehicle interiors. In various exemplary embodiments, an ornament in the form of a decorative badge is embedded in a console lid, in a way that limits the movement of the decorative badge, for example. Moreover, the decorative badge in certain embodiments is centered relative to a substrate and permits location of the badge in three directions, as discussed in more detail below.

In particular, in such embodiments, the decorative badge retains its position, and is not susceptible to off-center movements or rotation. Further, the height of the decorative badge may be maintained so as to preserve flushness with surrounding material. Such exemplary embodiments avoid the need to form decorative badges out of metal, and also omit attachment means such as stitching between the ornament and a substrate. These and other advantageous features will become apparent to those reviewing the present disclosure, and all such advantages are intended to fall within the scope of the present disclosure.

One embodiment of the present disclosure relates to an attachment structure configured to be installed in a vehicle interior. The attachment structure for a decorative vehicle component includes a base having a recess therein, a skin covering the base, and an ornament coupled to the base over a portion of the skin. The ornament includes a boss structured to engage with the recess so as to be inserted within the recess. A fastener couples the boss to the recess. An upper surface of the ornament is substantially flush with an upper surface of the skin. The recess and the boss are configured to locate the ornament relative to the base.

Another embodiment of the present disclosure relates to an assembly for a decorative vehicle component. The assembly comprises a substrate comprising a plurality of apertures; a skin layer covering the substrate; an ornament fixed to the substrate over a portion of the skin layer such that a surface of the ornament is substantially aligned in a vertical direction with a surface of the skin layer surrounding the ornament; a plurality of bosses extending from the ornament and comprising a first boss configured to engage with a first aperture of the plurality of apertures, the first boss having at least one tapered edge; and a fastener configured to fix the first boss to the first aperture. The first aperture and the first boss are configured to locate the ornament relative to the substrate; and the first boss comprises a first rib projecting from a surface thereof.

A further embodiment of the present disclosure relates to a method of manufacturing a portion of a vehicle console. The method comprises wrapping a substrate with a skin layer so as to at least partially envelop the substrate; cutting into the skin layer so as to perforate a surface thereof, thereby creating a cut portion of the skin layer; inserting at least one boss, which is coupled to an ornament, into a recess of the substrate through the cut portion; positioning the ornament relative to the base via the at least one boss; and guiding a terminal portion of the boss located distally to an exposed surface of the ornament base so as to align the terminal portion with a bottom portion of the recess.

BRIEF DESCRIPTION OF THE DRAWINGS

The details of one or more embodiments are set forth in the accompanying drawings and the description below. Other features, aspects, and advantages of the disclosure will become apparent from the description, the drawings, and the claims.

The figures summarized above are provided for the purpose of illustrating one or more embodiments, without limiting the scope or the meaning of the claims.

DETAILED DESCRIPTION

In the description that follows, structures and features that are the same or similar as shown in various views of the drawings may be denoted by the same reference numerals throughout the several views for consistency and simplicity, but it should be appreciated that various structures or features may differ.

Figure 1:
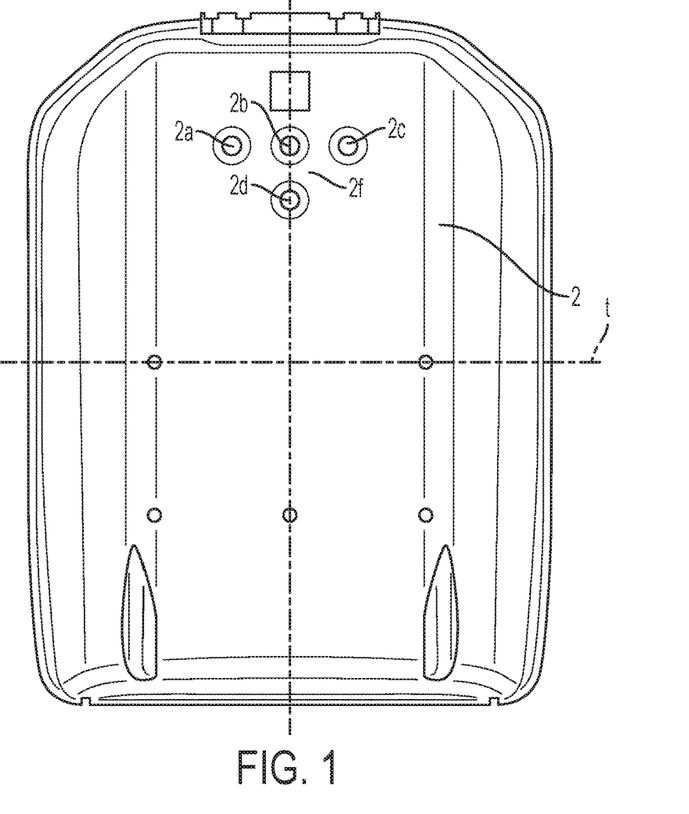
FIG. 1 is a top view of a substrate of a vehicle component, according to an exemplary embodiment.

FIG. 1 is a top view of a substrate 2 of a vehicle component, according to an exemplary embodiment. Specifically, the substrate 2 shown in FIG. 1 is a lid of a vehicle console. Via the lid, a vehicle occupant may access one or more interior compartments within the console. In some embodiments, the console may be provided in an arm rest, for example, as a central console between seats. More particularly, the substrate 2 is a base (e.g., a lid inner portion) which is covered by a skin 2f. The skin 2f is made of one or more materials suitable for upholstery in vehicle interiors, including but not limited to thermoplastic urethane ("TPU"), nylon, polyester, vinyl, faux leather or leather, or any combination thereof. In at least one embodiment, the skin 2f is directly applied on the substrate 2, and no intermediate layer is present between the skin 2f and the substrate 2. According to other exemplary embodiments, an intermediate layer of a cushioning material may be provided, such as a foam (e.g., a foam insert) or other material intended to provide padding or cushioning for the component. The intermediate layer may be a foam bun or cushion on which the relatively soft material of the skin 2f is wrapped. The foam insert may be formed as a rectangular block or sheet which is compressible so as to conform to a profile of the skin 2f, for example.

The substrate 2 is provided with a recess which is configured to receive a decorative badge 3, as discussed further below. The recess includes a plurality of openings (e.g., apertures, receptacles, etc.). For example, as shown in FIG. 1, the substrate 2 includes a first opening 2a, a second opening 2b, and a third opening 2c provided in a linear arrangement in a longitudinal direction along a longitudinal axis '1' of the substrate 2. The first opening 2a and the third opening 2c are outermost openings, with the opening 2b disposed between the first opening 2a and the third opening 2c. A fourth opening 2d is provided in a transverse direction along a transverse axis 't'. The fourth opening 2d is positioned at approximately the same position in the longitudinal direction as the second opening 2b and at a position lower in the transverse direction than the second opening 2b. The first through fourth openings 2a-2d are provided such that a first right triangle is formed by the first opening 2a, the second opening 2b, and the fourth opening 2d, and a second right triangle is formed by the third opening 2c, the second opening 2b, and the fourth opening 2d. Stated another way, the position of the openings forms a generally "T" shaped pattern. In certain exemplary embodiments, a different number of openings may be provided. Further, the arrangement of openings is not limited to that shown in FIG. 1.

Further, in at least one embodiment, the first opening 2a is provided at a first distance from a first lateral edge of the substrate 2 and a third opening 2c is provided at a second distance from a second lateral edge of the substrate 2 that is approximately equivalent to the first distance. The fourth opening 2d is located in a horizontal direction between the first opening 2a and the third opening 2c, but is offset so as to be farther away from a gripping portion of the lid (i.e., the portion that a vehicle occupant would manipulate to open the console lid) than the first, second and third openings 2a-2c. While the openings 2a-2d shown in FIG. 1 are circular and of approximately equivalent size, it should be appreciated that the openings 2a-2d may vary in shape, size and location.

Figure 2:
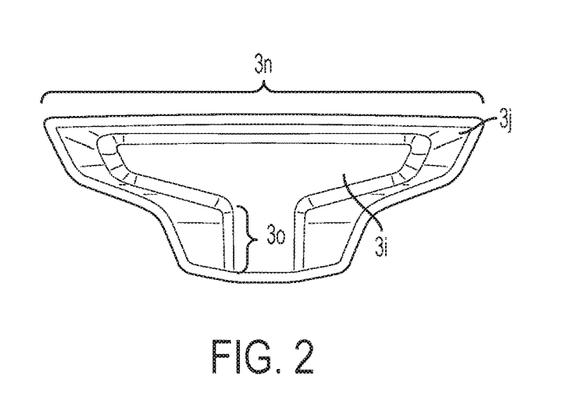
FIG. 2 is a top view of a decorative badge, according to an exemplary embodiment.

FIG. 2 is a top view of a decorative badge 3, according to an exemplary embodiment. More specifically, the decorative badge 3 is an ornament which is configured to be arranged with the substrate 2. The substrate 2 is, in at least one embodiment, a mating part that mates with the decorative badge 3, and serves as a carrier on which the decorative badge 3 is provided. Specifically, the decorative badge 3 is coupled to the substrate 2 over a portion of the skin 2f. The decorative badge 3 may be an escutcheon formed as a vehicle maker logo, a brand name, a vehicle model, a string of alphanumeric text, a symbol, or any combination thereof. The decorative badge 3 is an emblem intended to convey a distinct visual impression. In order to achieve an intended aesthetic impression, the decorative badge 3 should be positioned in its original position at the time of manufacturing and assembly. That is, the decorative badge should not deviate in position from its original location during subsequent use.

The decorative badge 3 may be made of one or more materials including, for example, hard plastic, metal, or other suitable materials. The material of the badge 3 may be harder than the material used for the skin 2f. For example, the badge 3 may be made of a hard plastic such as polyethylene, polyvinyl chloride, polypropylene and/or polystyrene. Such plastic may be rigid and harder than a soft material used for the vehicle interior, such as TPU. In at least one embodiment, the decorative badge may be provided with beading, e.g., one or more beads located at an outer periphery of the ornament. For example, one or more raised beads may be provided which are located on part or all of the periphery of the decorative badge 3. The one or more raised beads serve to pinch the skin material against a plastic lid inner (e.g., the substrate 2), creating an interference between the skin 2f and the decorative badge 3 to prevent movement of the skin 2f.

The decorative badge 3 may be positioned approximately flush with the surrounding material of the substrate 2. The decorative badge 3, in some implementations, may be positioned "sub-flush" with the surrounding material, i.e., at a slight offset, so as to be disposed just beneath the surrounding material (e.g., ±0.1 mm, ±0.2 mm, ±0.5 mm, ±1 mm, ±2 mm, or ±5 mm from an imaginary straight line connecting top surfaces of the surrounding material on left and right sides of the badge 3). As the decorative badge 3 is positioned either flush or sub-flush with respect to the surrounding material of the substrate 2, the decorative badge 3 appears distinct and from the surrounding material when positioned in its original location, and the entire assembly has a smooth finished appearance.

The decorative badge 3 may be formed as a simple shape (e.g., a circle or oval) or complex shape, a shape with one or more asymmetrical aspects, and/or a shape with a plurality of corners (e.g., a 'T' shape, or a shape having a combination of curvilinear and rectilinear elements). For example, as illustrated in FIG. 2, in at least one embodiment, the decorative badge 3 is formed as a 'T' shape having a body portion 3n which is substantially planar, and a stem 3o orthogonal to the body. The body portion 3n is longer than the stem 3o and is wider in a longitudinal direction than in a transverse direction of the decorative badge 3. The external surface of the decorative badge 3 is defined by a planar portion 3*i* and a contoured edge portion 3*j* extending around a perimeter of the planar portion 3*i*. The planar portion 3*i* and contoured edge portion 3*j* collectively form a cover or upper layer 3*m* of the decorative badge 3. The cover 3*m* is disposed so as to be substantially flush with an upper surface of the skin 2*f*. In this manner, the finished assembly has a smooth external appearance.

Figure 3:
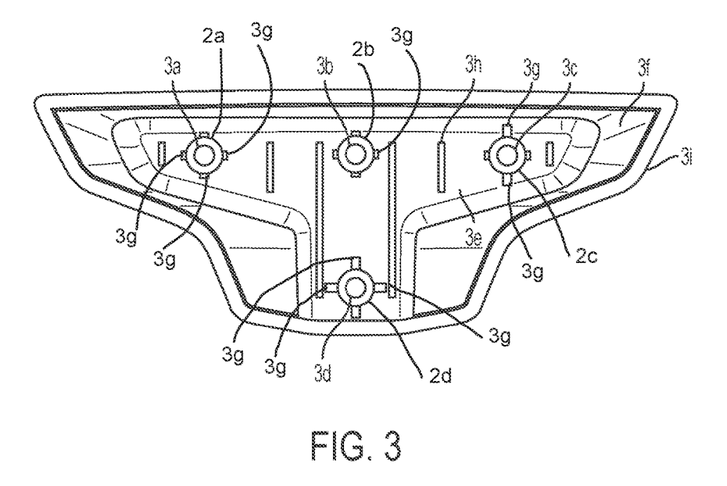
FIG. 3 is a bottom view of a decorative badge, according to an exemplary embodiment.

FIG. 3 is a bottom view of a decorative badge 3 according to an exemplary embodiment. As shown in FIG. 3, an underside (an underlying layer or base) of the decorative badge 3 is defined by a recessed portion 3*f* and an interior portion 3*e*. One or more raised portions 3*h* of material may be provided along the interior portion 3*e* so as to be parallel in the longitudinal direction of the interior portion 3*e*. The raised portions 3*h* are elevated with respect to the surface of the interior portion 3*e* on which they are provided.

A plurality of screw bosses 3*a*-3*d* are integrally formed with the decorative badge 3 and extend therefrom. Screw bosses 3*a*-3*d* are aligned so as to coincide with the openings 2*a*-2*d* of the substrate 2 when the decorative badge 3 is arranged with the substrate 2. By integrally forming the screw bosses 3*a*-3*d* with the decorative badge 3, the number of extra parts needed is advantageously reduced, and less labor is needed during assembly. More particularly, screw bosses 3*a*-3*c* are aligned to coincide with openings 2*a*-2*c* of substrate 2 and are positioned along a longitudinal direction of the decorative badge 3. Screw boss 3*d* is positioned to coincide with fourth opening 2*d*, which is disposed so as to be parallel with a center of the decorative badge 3 and spaced from a center of a decorative badge 3 in the transverse direction of the decorative badge 3. At least one of the bosses 3*a*-3*d* may be provided with a tapered edge at one end thereof. As shown in FIG. 3, for example, the fourth opening 2*d* and fourth screw boss 3*d* are disposed at a distal portion of the stem 3*o* of the decorative badge 3, such that the fourth opening 2*d* and fourth screw boss 3*d* are spaced apart from the second opening 2*b* and second screw boss 3*b* by the stem 3*o*.

The decorative badge 3 includes the first boss 3*a*, the second boss 3*b*, and the third boss 3*c* provided in a linear arrangement in a longitudinal direction along a longitudinal axis of the decorative badge 3. The first boss 3*a* and the third boss 3*c* are outermost bosses, with the boss 3*b* located between the first opening 2*a* and the third opening 2*c*. A fourth boss 3*d* is provided in a transverse direction along a transverse axis. The fourth boss 3*d* is positioned parallel to the second boss 3*b* and at a position lower in the transverse direction than the second boss 3*b*. The first through fourth bosses 3*a*-3*d* are provided such that a first right triangle is formed by the first boss 3*a*, the second boss 3*b*, and the fourth boss 3*d*, and a second right triangle is formed by the third boss 3*c*, the second boss 3*b*, and the fourth boss 3*d*. In certain exemplary embodiments, a different number of bosses may be provided. Further, the arrangement of bosses is not limited to that shown in FIG. 3.

Figure 4:
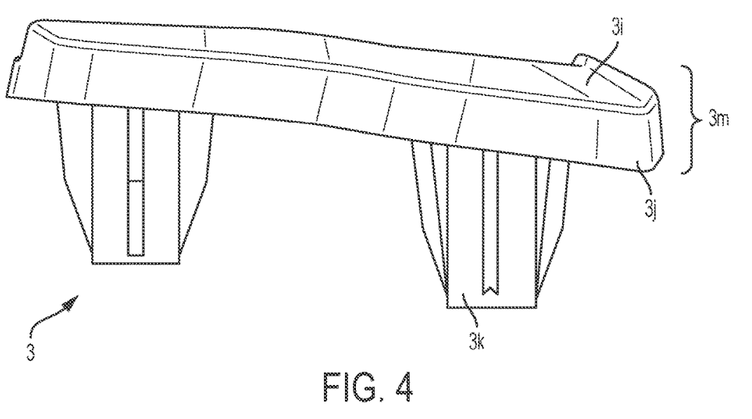
FIG. 4 is a perspective view of a decorative badge, according to an exemplary embodiment.

FIG. 4 is a perspective view of a decorative badge according to an exemplary embodiment. As seen from FIG. 4, the cover 3*m* is disposed at a top of the decorative badge 3. The cover 3*m* is thus positioned above components such as the bosses 3*a*-3*d*, which are provided with the interior portion 3*e* of the decorative badge 3, and the interior portion is separated from an outer periphery 3*l* of an underside 3*k* of the decorative badge 3 by the recessed portion 3*f*. The interior portion 3*e*, the recessed portion 3*f* and the outer periphery 3*l* form the underside 3*k* of the decorative badge 3, and are at least partially covered by the cover 3*m*.

Each of bosses 3*a*-3*d* is provided with a plurality of ribs 3*g* projecting from the first through the fourth bosses 3*a*-3*d*, as shown in FIG. 3. For example, boss 3*a* may be formed with multiple ribs 3*g* spaced 90° concentrically in the radial direction from each other, around the circumference of boss 3*a*. At least one boss may be formed with a pair of orthogonal ribs to prevent movement in the 'x' and 'y' directions, as discussed in more detail below. At least one boss may be provided with a single rib 3*g*. The ribs 3*g* may be provided in a cruciform arrangement with respect to each boss 3*a*-3*d*. Further, the ribs 3*g* may be tapered from one end to the other, for example, to have a larger portion which is closer to cover 3*m* of the decorative badge 3 and a smaller portion which is farther from the cover 3*m*, so as to further secure the decorative badge even when the recess of the substrate 2 is relatively deep. The first through fourth bosses 3*a*-3*d* and associated ribs provide structural rigidity to the decorative badge 3 and protect against sinking of the decorative badge 3 relative to the outer surface of the substrate 2. One or more of the bosses 3*a*-3*d* may be provided with a raised portion at a terminal thereof which acts as a pedestal, increasing structural rigidity by reinforcing the decorative badge 3. By providing the plurality of bosses 3*a*-3*d*, flexing and breaking of the decorative badge 3 may be avoided.

For a given boss (e.g., boss 3*a*), at least one of the ribs 3*g* is a reinforcement rib that is disposed lower in the vertical direction than another rib or ribs (e.g., first and second ribs) projecting from the boss. At least one of the ribs may be arranged so as to contact an inner surface of an opening (e.g., one of openings 2*a*-2*d*). As shown in FIG. 3, a first rib 3*g* is formed so as to extend in a first direction and a second rib 3*g* is formed to extend in a second direction on opposite sides of each boss 3*a*-3*d*. Thus, respective ribs contact inner surfaces of the respective openings 2*a*-2*d* in which the bosses 3*a*-3*d* are provided. In some embodiments, bosses 3*a*-3*d* may be provided with different numbers and/or arrangements of ribs 3*g*.

Figure 5:
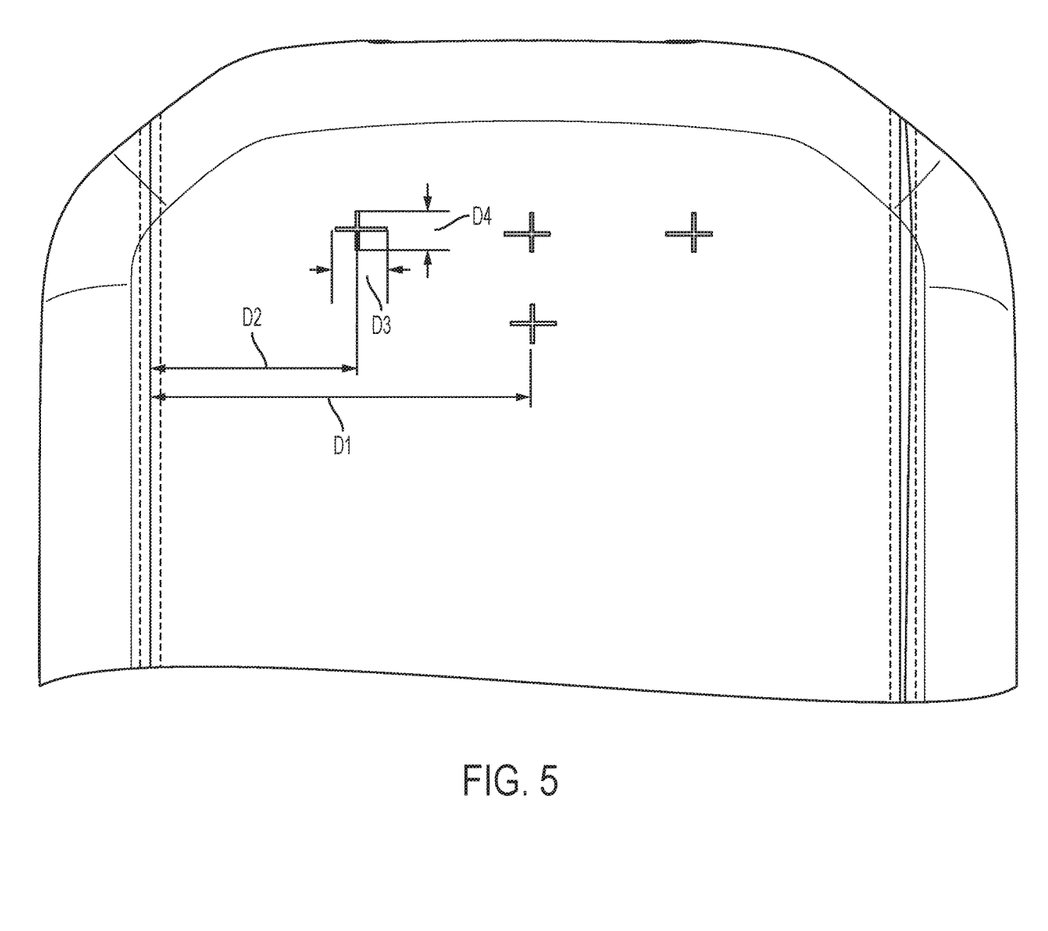
FIG. 5 is a top view of a portion of a skin layer, according to an exemplary embodiment.

FIG. 5 depicts a top view of a portion of a skin according to an exemplary embodiment. The skin (skin layer) 2*f* of substrate 2 is cut to form one or more cruciform cuts in the skin 2*f*. The cruciform cut is arranged such that at least a portion of the ribs (e.g., first and second ribs 3*g* of at least one of the bosses 3*a*-3*d*) align with longitudinal and transverse portions of the cruciform cut. The skin may be cut with a punch, for example. Further, central cuts (e.g., cuts aligned with bosses 3*b*, 3*d* at an approximate midpoint of an armrest) are positioned so as to be a first distance D1 from an edge of the armrest, whereas outermost cuts (i.e., the cuts aligned with bosses 3*a*, 3*c*) are positioned at a second distance D2 from the edge of the armrest, where D2 is less than D1. In some embodiments, one or more cuts may have a cruciform shape having a width D3 and a height D4, where D3 and D4 may be the same or different in dimension.

Figure 6:
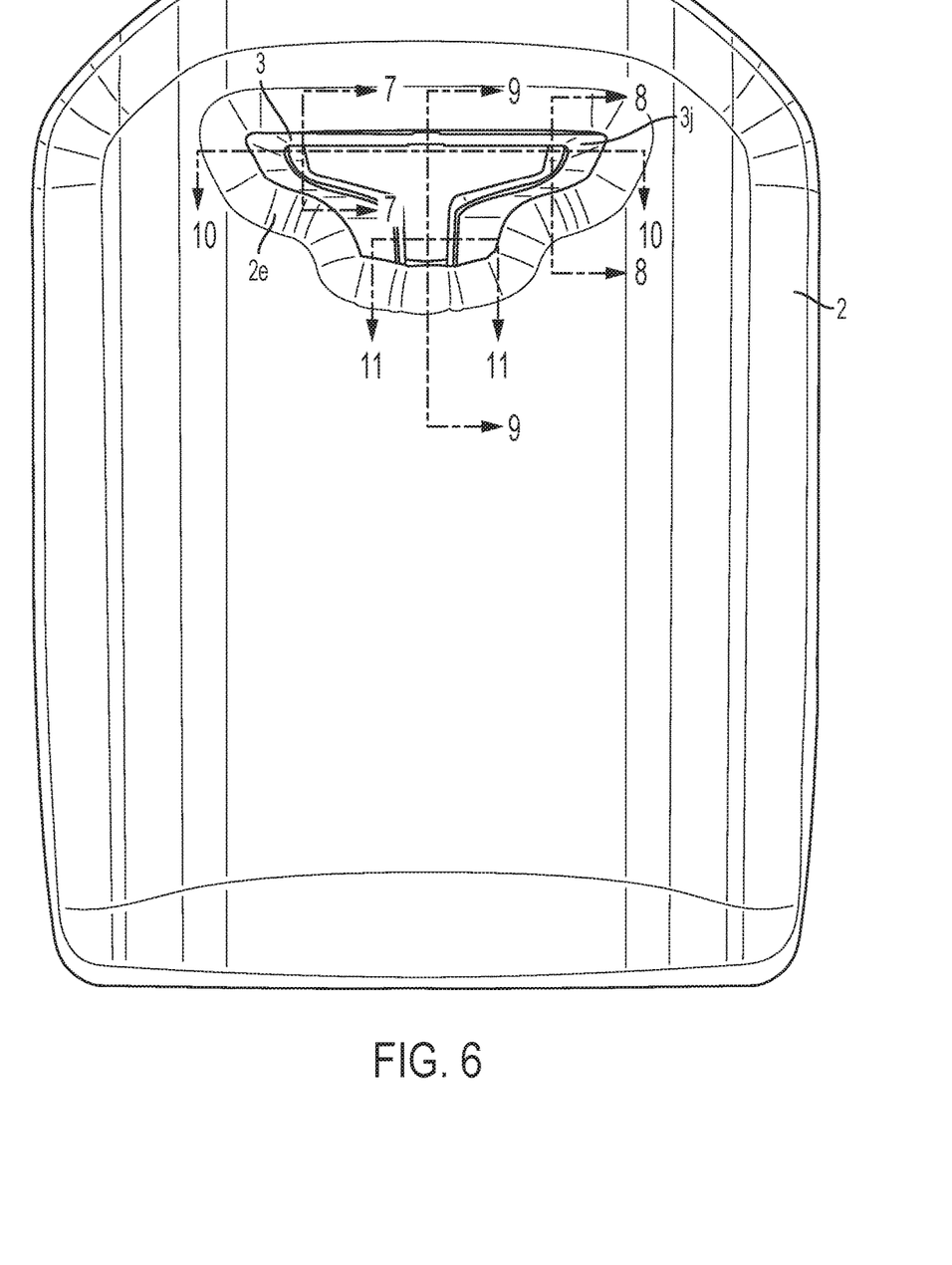
FIG. 6 is a top view of an assembly including a substrate and a decorative badge, according to an exemplary embodiment.

FIG. 6 is a top view of an assembly including a substrate and a decorative badge, according to an exemplary embodiment. As shown in FIG. 6, the decorative badge 3 is disposed such that the contoured edge portion 3*j* abuts against a portion 2*e* of the substrate 2 which surrounds the decorative badge 3. The bosses 3*a*-3*d* including the ribs 3*g* allow the decorative badge 3 to remain centered on the substrate 2 and to be substantially flush or sub flush to the substrate 2. In at least one embodiment, the bosses with ribs 3*g* permit the decorative badge 3 to be located in three directions—specifically, the 'x,' 'y,' and 'z' directions, where 'x' is the right-left direction, 'y' is the forward-backward direction, and 'z' is the up-down direction. In particular, by centering the decorative badge 3, rotations of the decorative badge 3 are prevented during assembly or wrapping of the substrate 2. Moreover, the height and flushness of the decorative badge 3 may be controlled with respect to a surface of the surrounding material (i.e., the portion 2e of substrate 2 immediately neighboring the decorative badge 3).

Figure 7:
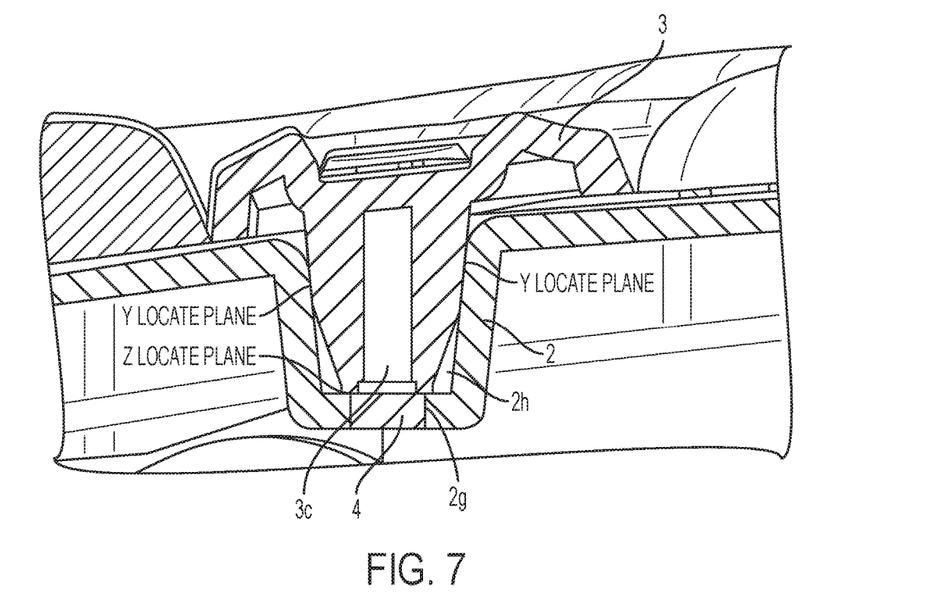
FIG. 7 is a partial cross-sectional view taken around line 7-7 of FIG. 6, according to an exemplary embodiment.

FIG. 7 is a partial cross-sectional view taken around line 7-7 of FIG. 6, according to an exemplary embodiment, showing a third boss 3c. As shown in FIG. 7, the third boss 3c is configured to engage with an aperture 2g in a recess 2h of the substrate 2 so as to engage with the recess 2h. In this manner, the boss 3c is inserted within the aperture 2g. Further, a fastener 4 is provided to couple the boss 3c to the aperture 2g. Similarly, each of bosses 3a, 3b and 3d are also provided with fasteners 4 configured to engage with respective apertures of substrate 2. The fasteners 4 secure the bosses 3a-3d, respectively, to the respective openings 2a-2d. As shown, for example, in FIG. 7, a terminal (end) portion of the boss 3c is fixed to a bottom portion of the recess 2h of the substrate 2. Thus, the boss is arranged such that at one end, the boss touches the bottom portion of the recess 2h of the substrate 2, and is disposed orthogonal to the cover 3m. Engaging the bottom portion of the recess 2h with the boss allows for the height of the decorative badge 3 to be set. Furthermore, the ribs 3g of the bosses engage with walls of the respective openings, while the skin 2f may be positioned within a space formed between ribs 3g.

Figure 8:
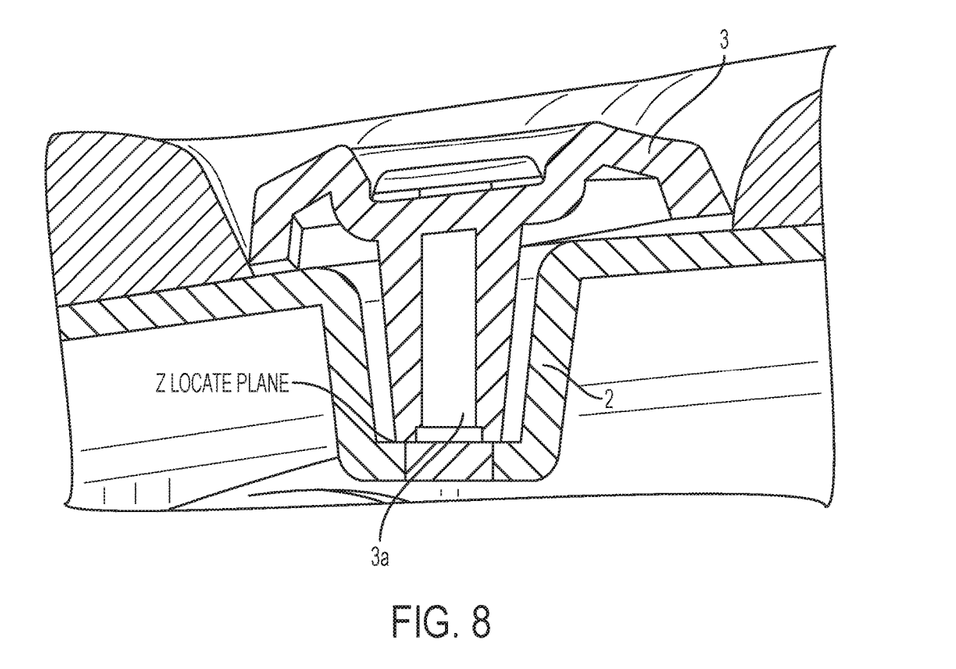
FIG. 8 is a partial cross-sectional view taken around line 8-8 of FIG. 6, according to an exemplary embodiment.

FIG. 8 is a partial cross-sectional view taken around line 8-8 of FIG. 6, according to an exemplary embodiment, showing boss 3a, among other features. The boss 3a is configured to locate the decorative badge 3 in one direction (the 'z' direction) relative to the substrate 2. The boss 3a and ribs 3g protruding therefrom are positioned so as to be clear of the substrate 2 in the 'x' direction and the 'y' direction. Thus, the boss 3a and associated ribs 3g permit locating of the decorative badge 3 in the 'x' direction using the plane of the boss 3a and the plane of the substrate 2.

Figure 9:
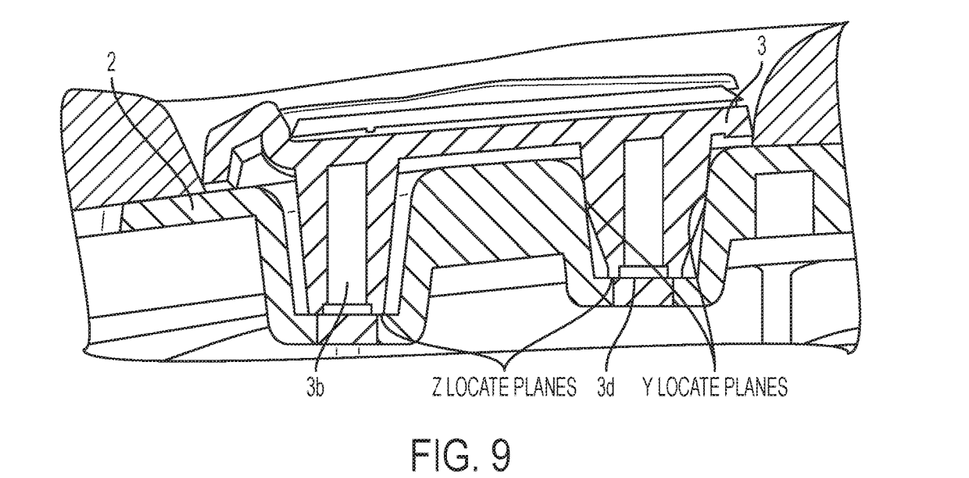
FIG. 9 is a partial cross-sectional view taken around line 9-9 of FIG. 6, according to an exemplary embodiment.

FIG. 9 is a partial cross-sectional view taken around line 9-9 of FIG. 6, according to an exemplary embodiment, showing second boss 3b, among other features. The second boss 3b, like the first boss 3a, is configured to locate the decorative badge 3 in one direction (the 'z' direction) relative to the substrate 2. The bosses 3a, 3b and ribs 3g protruding therefrom are positioned so as to be clear of the substrate 2 in the 'x' direction and the 'y' direction. Thus, the boss 3b and associated ribs 3g permit locating of the decorative badge 3 in the 'x' direction using the plane of the respective bosses and the plane of the substrate 2.

Figure 10:
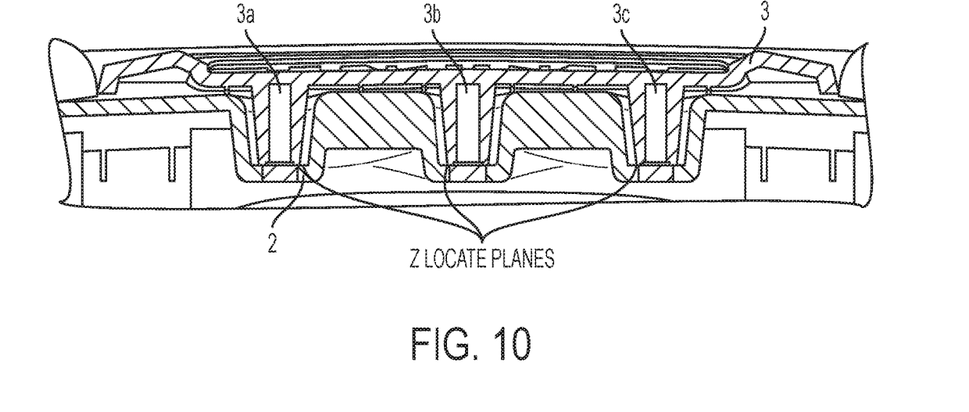
FIG. 10 is a partial cross-sectional view taken around line 10-10 of FIG. 6, according to an exemplary embodiment.

FIG. 10 is a partial cross-sectional view taken around line 10-10 of FIG. 6, according to an exemplary embodiment, showing first through third bosses 3a-3c. In contrast to first and second bosses 3a and 3b, third boss 3c permits location of the decorative badge 3 relative to the substrate 2 in two directions, so as to aid in preventing rotation of the decorative badge 3. In particular, boss 3c and boss 3d (discussed below) are provided together so as to effectively impede rotation of the decorative badge 3 and avoid deviations from an original (desired) position of the decorative badge 3. The third boss 3c and ribs 3g protruding therefrom are positioned so as to be clear of the substrate 2 in the 'x' direction. The third boss 3c and its associated ribs 3g permit location of the decorative badge 3 in the 'y' direction using the plane of rib 3g and the plane of the substrate 2. Further still, the third boss 3c and its associated ribs 3g permit location of the decorative badge 3 in the 'z' direction using the plane of rib 3g and the plane of the substrate 2.

Figure 11:
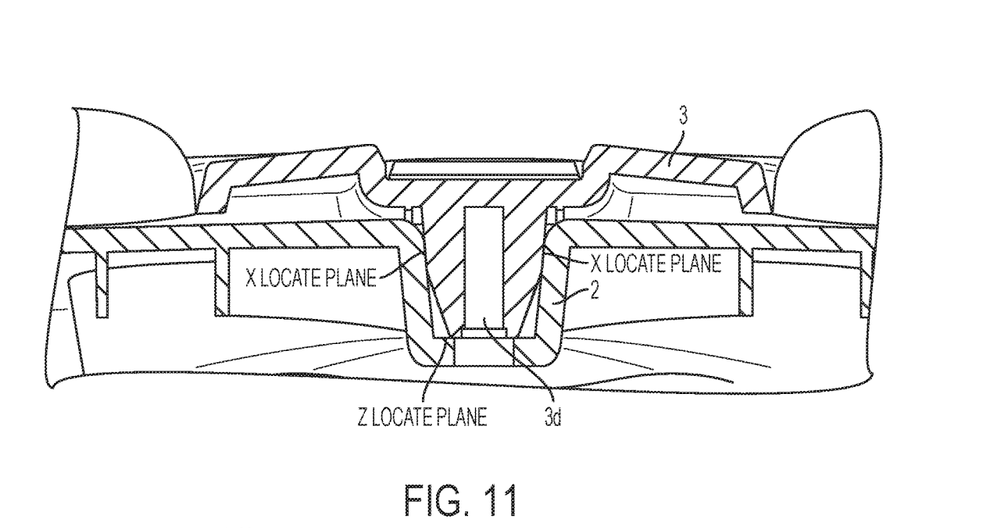
FIG. 11 is a partial cross-sectional view taken around line 11-11 of FIG. 6, according to an exemplary embodiment.

FIG. 11 is a partial cross-sectional view taken around line 11-11 of FIG. 6, according to an exemplary embodiment, showing the fourth boss 3d. The fourth boss 3d allows for locating of the decorative badge 3 in three directions relative to the substrate 2. As noted above, when paired with the third boss 3c, the fourth boss 3d acts to lock the decorative badge 3 in place and to prevent the decorative badge 3 from becoming off center. In particular, the fourth boss 3d is positioned so as to be clear of the substrate 2 in the 'x' direction, while allowing locating in the 'y' direction by virtue of the plane of its ribs 3g and the plane of the substrate 2. Further, the fourth boss 3d permits locating of the decorative badge 3 in the 'z' direction using the plane of the fourth boss 3d and the plane of the substrate 2.

Figure 12:
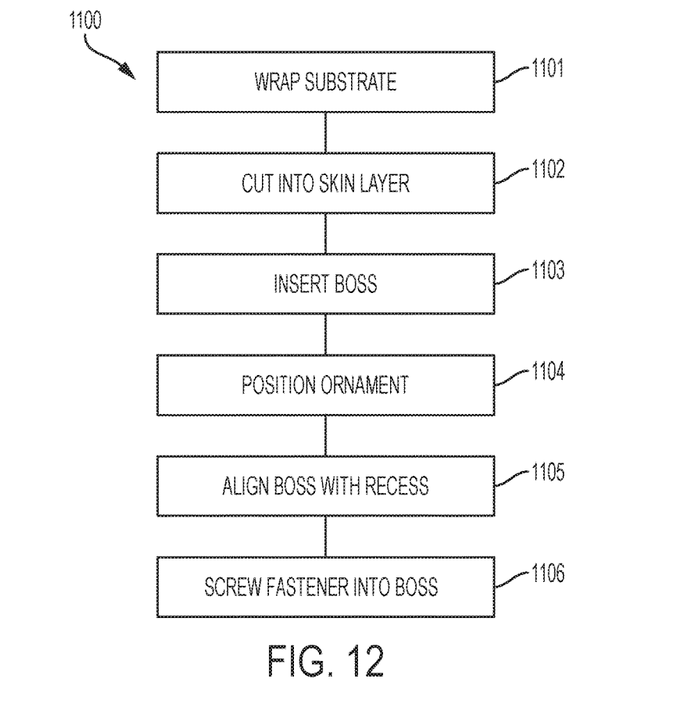
FIG. 12 is a process diagram relating to a method of manufacturing a portion of a vehicle console, according to an exemplary embodiment.

FIG. 12 is a process diagram relating to a method 1100 of manufacturing a portion of a vehicle console, according to an exemplary embodiment. The method of manufacturing a portion of a vehicle console includes wrapping a substrate 2 with a skin layer (e.g., skin 2f) so as to at least partially envelop the substrate 2 (step 1101). The method further includes cutting into the skin layer so as to perforate a surface thereof, thereby creating a cut portion of the skin layer (1102). For example, the cut portion may be formed in a cruciform shape, as discussed above. The method still further includes inserting at least one boss (e.g., bosses 3a-3d), which is coupled to decorative badge 3, into a recess of the substrate 2 through the cut portion (1103).

The method 1100 additionally includes positioning the decorative badge 3 relative to the substrate 2 via at least one boss (1104), and guiding a terminal portion of the boss located distally to an exposed surface of the base of the decorative badge 3 so as to align the terminal portion with a bottom portion of the recess of the substrate 2 (1105). The method additionally includes screwing fasteners 4 into the respective bosses in order to secure the decorative badge 3 in place (1106). In some embodiments, steps 1101-1106 are performed when an armrest (or other portion of a vehicle console) on which the decorative badge 3 is to be provided is positioned upside down. The entire process of assembling the decorative badge 3 with the armrest may be carried out when the armrest is positioned upside down as compared to its final assembled position, according to at least one exemplary embodiment.

Figure 13:
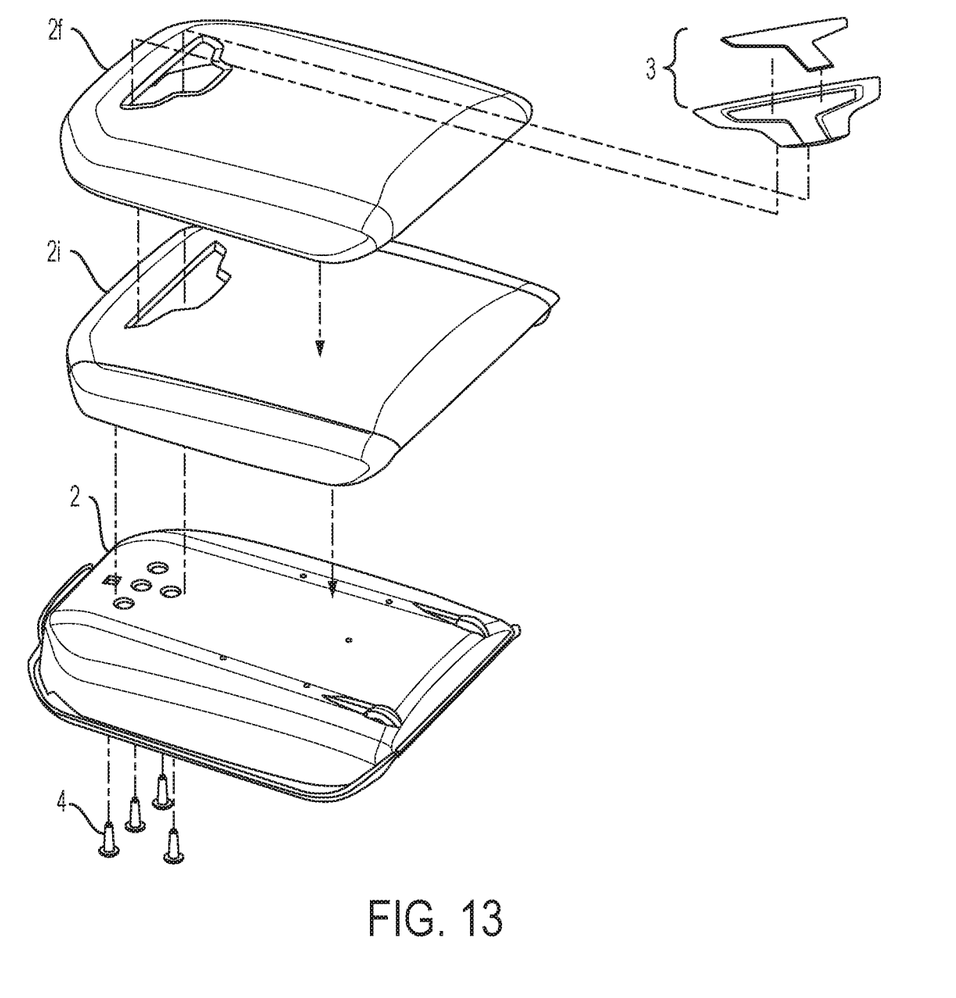
FIG. 13 is an exploded view of an assembly according to an exemplary embodiment.

FIG. 13 is an exploded view of an assembly including the decorative badge 3 and a portion of a vehicle console, according to an exemplary embodiment. The assembly may be carried out according to the methods described above. For example, the decorative badge 3 is positioned relative to the skin layer 2f. The skin layer 2f is arranged atop a foam insert (e.g., a foam bun) 2i, which is an intermediate layer between the skin layer 2f and the substrate 2. As indicated in FIG. 13, a plurality of fasteners 4 are positioned so as to coincide with openings in the recess of substrate 2, and are used to screw bosses 3a-3d of the decorative badge 3 in place. While FIG. 13 depicts the substrate 2, the foam insert 2i, the skin 2f and the decorative badge 3 in an orientation corresponding to a final assembly position, it should be appreciated that the foregoing components may be assembled together in an upside down configuration, as noted above.

The installation structures and methods described above may be applied in a variety of implementations. For example, the above-mentioned installation structures and methods may be employed in order to install a decorative badge in a lid for a console in an automotive vehicle, a motorcycle, a scooter, a motorbike, a naval vessel or an aircraft. Further, the aforementioned techniques may be used to emplace a decorative badge in structures other than a console lid, e.g., a glove compartment, a panel, a seat back, and a steering wheel, for example. The foregoing examples are intended to be illustrative and not limiting of the implementations of the techniques described herein.

As may be utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to precise numerical ranges. Accordingly, these terms should be interpreted as indicating that insubstantial or inconsequential modifications or alterations of the subject matter described and claimed are considered to be within the scope of the inventions as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures of this application. It should be noted that the orientation of various elements may differ according to other exemplary embodiments, and that such variations are intended to be encompassed by the present disclosure.

The construction and arrangement of the elements of the decorative badges, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure.

It is to be understood that although the present invention has been described with regard to preferred embodiments thereof, various other embodiments and variants may occur to those skilled in the art, which are within the scope and spirit of the disclosure, and such other embodiments and variants are intended to be covered by corresponding claims. For example, any element disclosed in one embodiment may be incorporated or utilized with any other embodiment disclosed herein. Also, for example, the order or sequence of any process or method steps may be varied or re-sequenced according to alternative embodiments. Other substitutions, modifications, changes and omissions may be made in the design, operating configuration, and arrangement of the preferred and other exemplary embodiments without departing from the scope of the appended claims.

The invention claimed is:

1. An attachment structure for a decorative vehicle component, comprising:
   a base having a recess therein;
   a skin covering the base;
   an ornament coupled to the base over a portion of the skin, the ornament comprising a boss structured to engage with the recess so as to be inserted within the recess; and
   a fastener coupling the boss to the recess;
   wherein an upper surface of the ornament is substantially flush with an upper surface of the skin;
   wherein the recess and the boss are configured to locate the ornament relative to the base;
   wherein the ornament comprises:
      a body portion which is substantially planar and wider in a longitudinal direction than in a transverse direction of the ornament; and
      a stem that is orthogonal to the body portion, the body portion being longer than the stem;
   wherein the recess comprises a first opening, a second opening, a third opening, and a fourth opening, wherein the first, second, and third openings are positioned along the longitudinal direction of the ornament, and the fourth opening is positioned so as to align with a center of the ornament in the longitudinal direction and be spaced from the first opening or the third opening in the transverse direction of the ornament;
   wherein the boss is a first boss and the ornament comprises a second boss, a third boss, and a fourth boss, wherein each of the four bosses are engaged in one of the four openings; and
   wherein the fourth opening and the fourth boss are disposed at a distal portion of the stem.

2. The attachment structure of claim 1, wherein:
   the first boss is positioned in the longitudinal direction along a longitudinal axis of the ornament;
   the fourth boss is positioned in the transverse direction along a transverse axis of the ornament; and
   the first boss and the fourth boss are formed integrally with the ornament.

3. The attachment structure of claim 2, wherein:
   the first boss is configured to engage with the first opening and the second boss is configured to engage with the second opening.

4. The attachment structure of claim 3, wherein:
   the first opening and the first boss are configured to locate the ornament relative to the longitudinal direction and the transverse direction of the base, and
   the second opening and the second boss are configured to lock rotation of the ornament.

5. The attachment structure of claim 1, wherein:
   the second opening and the second boss are positioned at the center of the ornament in the longitudinal direction; and
   the fourth opening and the fourth boss are aligned with the second opening and the second boss in the longitudinal direction and spaced apart from the second opening and the second boss by the stem.

6. An attachment structure for a decorative vehicle component, comprising:
a base having a recess therein;
a skin covering the base;
an ornament coupled to the base over a portion of the skin, the ornament comprising a boss structured to engage with the recess so as to be inserted within the recess;
a fastener coupling the boss to the recess; and
a cut formed through the skin,
wherein an upper surface of the ornament is substantially flush with an upper surface of the skin;
wherein the recess and the boss are configured to locate the ornament relative to the base;
wherein the boss is inserted into the recess through the cut;
wherein the boss comprises a rib projecting from a surface thereof, and
wherein the cut is formed in a cruciform shape.

7. The attachment structure of claim 1, wherein the boss is disposed so as to contact a bottom of the recess and to extend orthogonally to the surface of the ornament.

8. An assembly for a decorative vehicle component, comprising:
a substrate comprising a plurality of apertures;
a skin layer covering the substrate;
an ornament fixed to the substrate over a portion of the skin layer such that a surface of the ornament is substantially aligned in a vertical direction with a surface of the skin layer surrounding the ornament;
a plurality of bosses extending from the ornament and comprising a first boss configured to engage with a first aperture of the plurality of apertures, the first boss having at least one tapered edge; and
a fastener configured to fix the first boss to the first aperture;
wherein the first aperture and the first boss are configured to locate the ornament relative to the substrate;
wherein the first boss comprises a first rib projecting from a surface thereof; and
wherein the first rib is configured to contact an inner surface of the first aperture in a first direction.

9. The assembly of claim 8, wherein the first boss further comprises a second rib configured to contact the inner surface of the first aperture in a second direction.

10. The assembly of claim 9, wherein:
the plurality of apertures comprises at least the first aperture and a second aperture;
the plurality of bosses comprises the first boss and a second boss; and
the second boss comprises a third rib disposed to contact an inner surface of the second aperture.

11. The assembly of claim 9, wherein the first boss comprises a third rib which reinforces the boss and is offset from the first and second ribs.

12. The assembly of claim 9, wherein:
a cruciform cut is formed in the skin layer, and
the first and second ribs are disposed so as to respectively align with longitudinal and transverse portions of the cruciform cut.

13. An assembly for a decorative vehicle component, comprising:
a substrate comprising a plurality of apertures;
a skin layer covering the substrate;
an ornament fixed to the substrate over a portion of the skin layer such that a surface of the ornament is substantially aligned in a vertical direction with a surface of the skin layer surrounding the ornament;
a plurality of longitudinal bosses extending from the ornament and positioned in a longitudinal direction along a longitudinal axis of the ornament; and
a transverse boss extending from the ornament and positioned in a transverse direction along a transverse axis of the ornament with respect to one of the plurality of longitudinal bosses;
wherein a first boss of the longitudinal bosses has first ribs extending from the first boss along the transverse direction;
wherein the transverse boss has first ribs extending from the transverse boss along the transverse direction and second ribs extending from the transverse boss along the longitudinal direction, and
wherein each of the ribs is configured to engage with a respective aperture of the plurality of apertures.

* * * * *